United States Patent Office 3,151,701
Patented Oct. 6, 1964

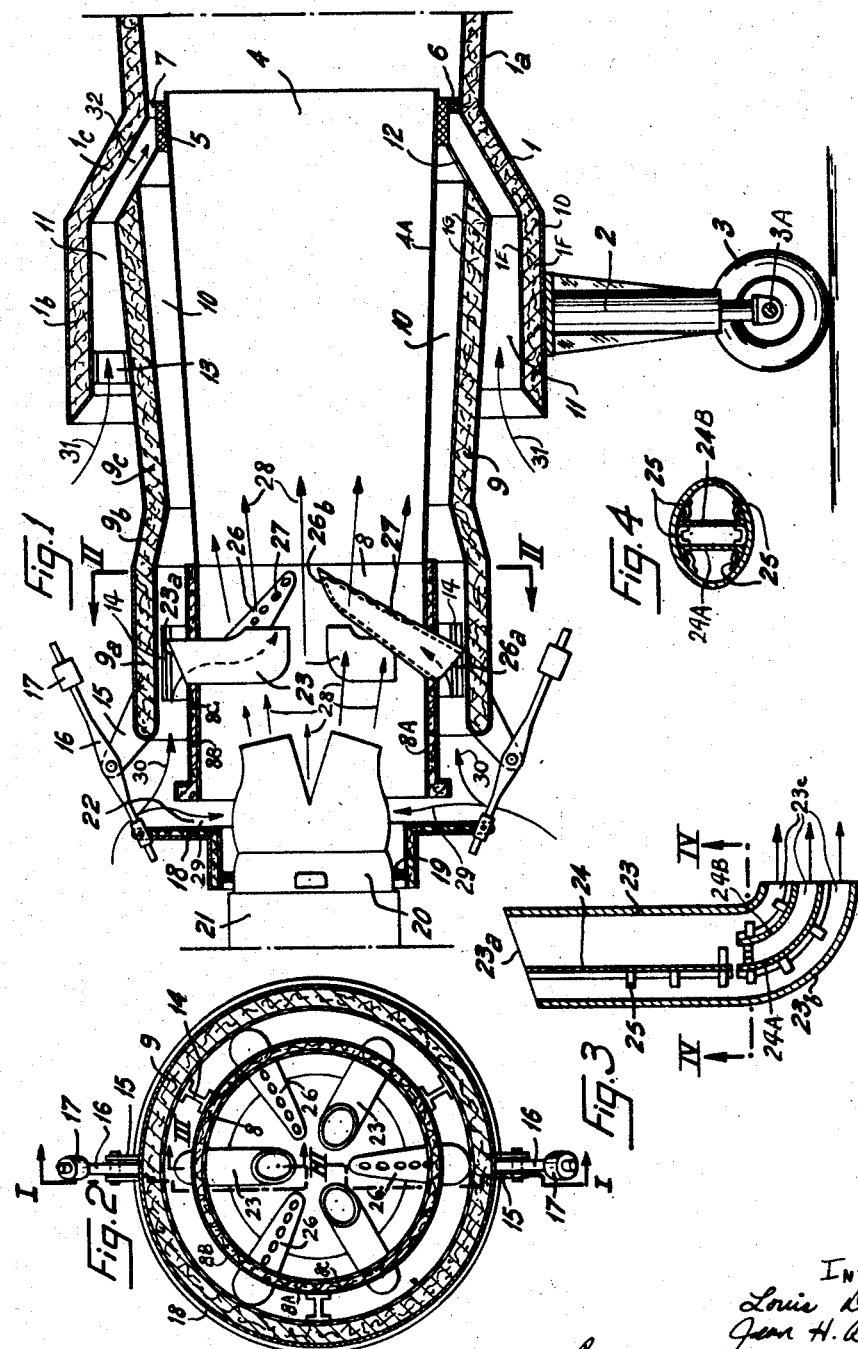

3,151,701
JET SILENCER
Louis Duthion, Paris, and Jean H. Bertin, Neuilly-sur-Seine, France, assignors to Societe Bertin & Cie, Paris, France, a company of France
Filed Dec. 26, 1961, Ser. No. 161,828
Claims priority, application France Jan. 3, 1961
9 Claims. (Cl. 181—51)

This invention relates to jet silencers of the type used on airfields and adapted to be removably attached to the outlet of the jet nozzle of an aircraft for reducing the noise produced by the blast of exhaust gases therefrom.

Jet silencers of this type are known, which generally include a conduit structure provided with means for supporting it coaxially with the outlet of a jet nozzle to be silenced, and formed with air intake means for mixing the exhaust gases with atmospheric air so as to dissipate a substantial part of the kinetic energy of said gases and thereby diminish the noise produced by them.

It is an object of this invention to provide a jet silencer of increased effectiveness and one that will be especially adapted for use with high-powered aircraft jet power plants, e.g. of the post-combustion type, in which the exhaust blast issues from the jet nozzle at high temperatures and velocities.

In accordance with the invention, it has been found that the noise-killing efficiency of a jet silencer can be considerably enhanced by placing transverse baffle means in the path of the gas flow and providing the baffle means with air intakes for directing air from the exterior of the conduit in which the baffle means are mounted and discharging said air into the interior of said conduit in the general direction of the flow of exhaust gases.

According to an aspect of the invention, a jet silencer comprises a conduit, means for supporting the conduit generally coaxially with the outlet of a jet nozzle to be silenced, at least one tubular member supported in said conduit extending in a direction having a radial component to the conduit, said member having an air intake externally of the conduit and having at least one air discharge aperture within the conduit opening in the same general direction as the flow of jet gases.

The transverse baffle means provided by the tubular members are positioned at a sufficient axial distance from the jet nozzle so that the high-temperature exhaust gases striking them will flow past them without any likelihood of being propelled back into the jet nozzle. Since such members are subjected to high temperatures and high thrusts from the exhaust blast they should be of sturdy construction and arranged to be efficiently cooled by the air flow through them.

An exemplary embodiment of the invention will now be described for purposes of illustration but not of limitation with reference to the accompanying drawings, wherein:

FIGURE 1 is a view in cross section on the line I—I of FIGURE 2 showing the front or inlet part of an improved silencer assembly constructed according to the invention.

FIGURE 2 is a transverse cross sectional view on line II—II of FIGURE 1.

FIGURE 3 is a detail view taken on line III—III of FIGURE 2 on an enlarged scale showing a longitudinal section through one type of tubular baffle member according to the invention as used in the embodiment of FIGURES 1 and 2.

FIGURE 4 is a cross sectional view on the line IV—IV of FIGURE 3.

In the illustrated embodiment, the silencer is arranged to be supported on a movable frame including hydraulic struts 2 projecting downwardly therefrom and having wheels 3 each rotatably mounted on a shaft 3A at the lower ends thereof.

The silencer assembly proper comprises an outer conduit 1 having a diverging outlet section 1a. If desired the outlet extension may terminate in a generally conventional upwardly bent stack, not shown. Ahead of the outlet section the silencer conduit 1 includes a cylindrical section 1b which is connected with the diverging outlet section 1a by way of a converging connection section 1c. For noise-isolating purposes the conduit 1 is double walled, including two spaced walls 1D and 1E of metal sheet between which is inserted a mass of felt-like fiber material 1F. The inner wall 1E is formed with a multiplicity of perforations 1G as shown.

The silencer assembly further includes an inner conduit 4 adapted to be inserted as shown into the inlet section 1b of the outer conduit 1. The inner conduit 4 comprises a generally diverging frustoconical section 4A made of perforate metal sheet, and supported in coaxial position within the outer conduit 1 by means of a ring 5 fixed around the outer periphery of conduit 4 near its outlet end and engaged at circumferentially spaced points by spacer members 6 projecting from the conduit section 1a as shown. The spacer members 6 define passages 7 between them whereby a continuous flowpath is provided between the two parts of the silencer. The frustoconical section 4A of conduit 4 is extended in the forward direction by a cylindrical section 8 comprising spaced walls 8A and 8B, between which is provided sound-proofing means 8C, all in a manner somewhat similar to that described above.

A third component of the silencer assembly is provided by an intermediate conduit 9 which surrounds the inner conduit 4 over the major part of the length of the latter and extends partly into the forward portions 1b and 1c of the outer conduit 1, being radially spaced from both said inner and outer conduits 1 and 4 so as to define a first annular space 10 with the inner conduit 4 and a second annular space 11 with the outer conduit 1. The third or intermediate conduit 9 is formed with double walls including sound-absorbing fiber material between them similar to the walls of the outer conduit 1, and is supported in position by being connected through spaced arms 12 to the periphery of the ring 5, through radial arms 13 to the portion 1b of outer conduit 1 and through further radial arms 14 (FIGURE 2) to the cylindrical section 8.

The intermediate silencer conduit 9 includes a cylindrical upstream or inlet section 9a which surrounds the cylindrical section 8, followed by a converging intermediate connecting section 9b followed in turn by a diverging downstream or outlet section 9c extending around, and generally parallel to the conduit section 4.

Secured to the inlet end of the intermediate conduit 9 and projecting outward therefrom are a pair of two-part brackets 15, between which are pivoted respective levers 16. Each lever 16 has a counterweight 17 adjustably slidingly mounted on one arm of the lever, extending generally toward the silencer assembly, while the opposite arms of the levers are pivotally connected to opposite points of the periphery of an annular member 18 which is thus supported adjacent to and spaced forwardly from the front end of the conduit section 8 of the silencer assembly as shown at 22. The annular member 18 includes, as shown, a flat radial flange peripherally thereof and a cylindrical flange or body inwardly thereof. The cylindrical flange portion of member 18 is adapted to be inserted around the jet nozzle 20 of an aircraft partially shown at 21, and has an annular seal 19 secured to its internal surface for sealing engagement with the periphery of said jet nozzle, the seal 19 being made of asbestos-base or equivalent refractory material.

In accordance with the invention, means are provided within the inner conduit of the silencer assembly, and specifically within the section 8 thereof, for providing energy-dissipating baffles generally transverse to the flow of exhaust gases from the jet nozzle 20, while simultaneously providing air inlets into the silencer. The said baffle means may assume a variety of different forms and for illustrative purposes two different forms have been shown, it being understood however that either one or the other type may be used alone, or both types may be used simultaneously, as well as baffles of other shapes. As shown, there are provided a first set of baffles in the form of a plurality of radially extending tubes or pipes 23, three in number as shown in FIGURE 2, comprising rectilinear portions extending through the wall of conduit section 8 and opening out at a small angle in the forward direction as shown, while the inner ends of said pipes are curved at 23b and thus directed at right angles so as to define outlet ports 23C which open rearwardly in an axial direction i.e. parallel with the general flow of the exhaust gases, which flow is indicated by the arrows 28 in FIGURE 1. FIGURES 3 and 4 illustrate the detailed structure of the pipes 23 in one form of construction, and it will be seen that each pipe has an oval cross section with its major axis directed transversely of the silencer structure. Internally the straight section of each pipe 23 is provided with one or more longitudinally extending webs 24 mounted therein by way of clamps 25, while its curved elbow section 23b is provided internally with similarly mounted curved baffles 24A and 24B. The webs 24, 24A and 24B are loosely held and thus slidable in some of the clamps 25 (as will be apparent from FIGURE 4) to provide for thermal expansion. The webs are disposed to channel the air and provide an increased cooling action for those areas of the wall of pipe 23 which are directed upstream against the exhaust jet and which are hence more directly exposed to the flame.

The other exemplary form of baffle means shown comprises a set of three pipes 26 of generally tapered form with their wider ends 26a projecting outwards through the wall of conduit section 8, and said pipes extending at a common rearward angle to the axis of said conduit as clearly shown in FIGURES 1 and 2. Each pipe 26 is closed at its narrow inner end 26b and is formed with one or more rows of holes 27 in the wall area thereof directed downstream in the direction of flow of the exhaust jet.

In operation, the hot blast of exhaust gases issuing from jet nozzle 20 create a suction-inducing draft through the conduit assembly of the silencer, so that air from the surrounding atmosphere is drawn in by Venturi effect through the annular spaces such as 22, 10, 11 and 7, as illustrated by arrows 29, 30, 31 and 32 respectively in FIGURE 1. Further air is sucked in at high velocity through the radially outer air intake openings 23a and 26a of the respective pipe-like baffles provided according to the invention and these high-speed streams of air are found to be effective in absorbing and dissipating the sound energy of the exhaust blast. Moreover, all remaining sonic vibrations are reflected and/or absorbed on the sound-proofed walls of the conduits.

The pipe-like baffles such as 23 and 26 present only a relatively small surface area to the hot gases and the high-speed air streams flowing through them are effective in cooling them, so that the silencer of the invention is well-suited for use with jet aircraft power plants of the post-combustion type in which the exhaust gases may be at extremely high temperatures.

The perforate diverging conduit section 4 augments the air suction effect through the assembly and through the tubular baffles, while not interfering with the sound proofing action of the intermediate conduit section 9. At the same time it contributes to the protection of the sound-proofing materials provided in the wall of said section 9 against the eroding effect of the exhaust gases. The outer conduit 1 serves to provide an additional amount of air intake through the annular space 11 and thus further improves the kinetic energy-dissipating action of the silencer assembly.

It will be understood that various changes may be made in the structure of the invention as shown and described without exceeding the scope of the invention. Besides the modifications in form of the tubular baffles referred to above, the general construction of the conduits comprising the silencer assembly may depart considerably from that shown by way of example.

What we claim is:

1. A silencer adapted to be removably fitted to the jet nozzle of a jet reaction engine and comprising in combination: an inner conduit having a soundproofed cylindrical section of greater diameter than said nozzle adapted to be located around the outlet of said nozzle in substantially coaxial relationship therewith, said inner conduit being provided with apertures therethrough regularly distributed around its periphery and including a frusto-conical diverging section axially aligned with said cylindrical section, said diverging section having a wall which is provided with multiple perforations; a second conduit coaxial to said inner conduit and surrounding it at a distance therefrom, whereby an annular space is formed between both conduits, said second conduit having a cylindrical section surrounding a major part of said cylindrical portion of said inner conduit and a diverging section substantially parallel to and surrounding a major part of said frusto-conical section; and tubular members fitted within said apertures of said inner conduit and directed substantially radially thereof, said tubular members projecting and opening into said annular space and being provided inside said inner conduit with outlet ports directed towards said frustoconical section, whereby air from said annular space may be mixed with the gas ejected by said nozzle.

2. A silencer as claimed in claim 1 wherein said second conduit is soundproofed, its cylindrical section being connected to its diverging section by a converging section.

3. A silencer as claimed in claim 1 wherein said tubular members comprises a rectilinear portion substantially perpendicular to the axis of said inner conduit and an elbow portion providing said outlet port.

4. A silencer as claimed in claim 3 wherein said rectilinear portion has a generally oval cross section with its major axis parallel to the axis of said conduits, said tubular member being provided with longitudinal partition means for channeling the air flow therethrough.

5. A silencer as claimed in claim 1 wherein each of said tubular members has a substantially frustoconical shape, said members being closed at their inner end and directed obliquely towards said diverging section of said inner conduit.

6. A silencer as claimed in claim 1 further comprising an annular member having a diameter greater than said nozzle and adapted to be fluid tightly fitted around said nozzle at a distance from said inner conduit, said annular member being connected to said second conduit by means of levers provided with counter weights.

7. A silencer adapted to be removably fitted to the jet nozzle of a jet reaction engine and comprising in combination: an inner conduit having a soundproofed cylindrical section of greater diameter than said nozzle adapted to be located around the outlet of said nozzle in substantially coaxial relationship therewith, said inner conduit being provided with apertures therethrough regularly distributed around its periphery and including a frustoconical diverging section axially aligned with said cylindrical section, said diverging section having a wall which is provided with multiple perforations; an intermediate conduit coaxial to said inner conduit and surrounding it at a distance, whereby an annular space is formed between both conduits, said intermediate conduit having a cylindrical section surrounding a major part of said cylindrical section of said inner conduit and a diverging section substantially parallel to and surrounding a major part of said frusto-conical section; tubular members fitted within said apertures of said inner conduit and directed substantially radially thereof, said tubular members projecting and opening into said annular space and being provided, inside said inner conduit, with outlet ports directed towards said frustoconical section; and an outer conduit surrounding a major part of said diverging section of said intermediate conduit, and spaced therefrom whereby an annular space is formed between said intermediate and outer conduits and whereby air sucked into said annular spaces may be mixed with the gas ejected by said nozzle.

8. A silencer as claimed in claim 7 wherein said outer conduit comprises a cylindrical section surrounding said diverging section of said intermediate conduit, a converging section surrounding the outlet end of said diverging section of said inner conduit and a diverging outlet section.

9. A silencer as claimed in claim 8 wherein said intermediate and outer conduits are soundproofed.

References Cited in the file of this patent

UNITED STATES PATENTS

| | | |
|---|---|---|
| 2,944,392 | Tyler | July 12, 1960 |
| 2,974,744 | Wade | Mar. 14, 1961 |
| 2,997,845 | Oulianoff | Aug. 29, 1961 |
| 3,002,341 | Muzzy et al. | Oct. 3, 1961 |

FOREIGN PATENTS

| | | |
|---|---|---|
| 835,032 | Great Britain | May 18, 1960 |
| 865,421 | Great Britain | Apr. 19, 1961 |